Patented Sept. 5, 1939

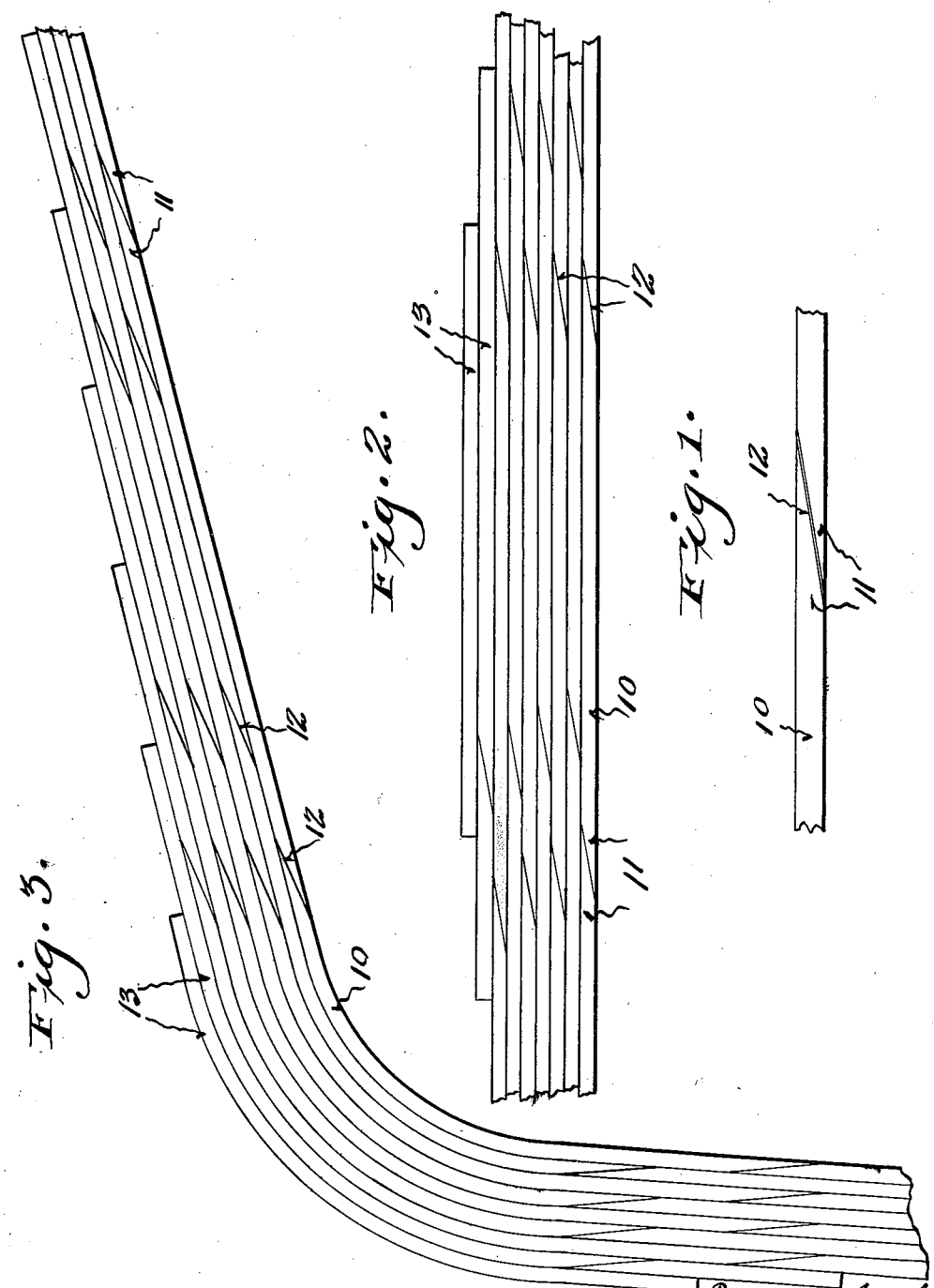

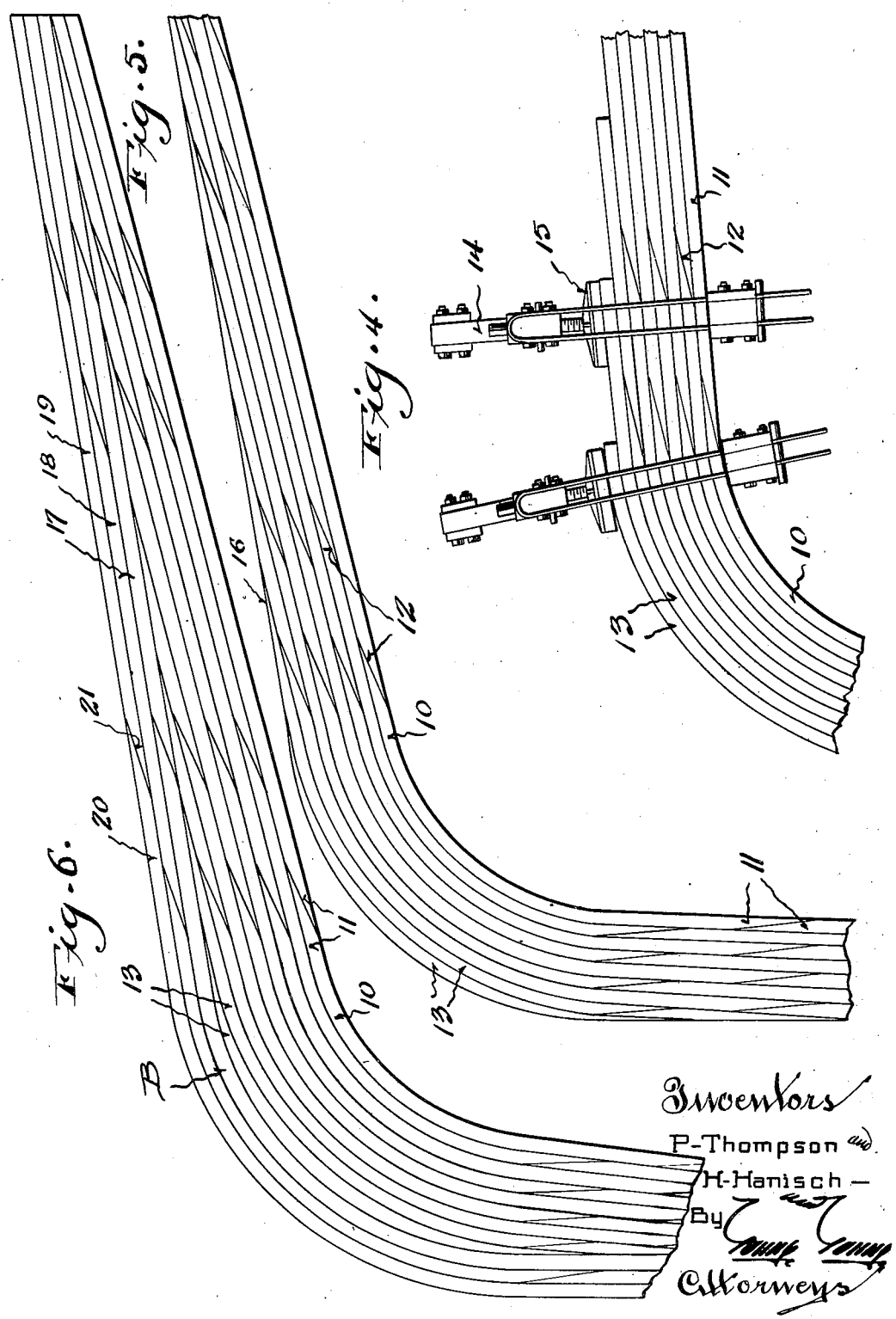

2,172,093

UNITED STATES PATENT OFFICE 2,172,093

PROCESS OF MANUFACTURING BUILDING ARCHES

Peter Thompson and Herbert Hanisch, Peshtigo, Wis., assignors to Unit Structures, Inc., Peshtigo, Wis., a corporation of Wisconsin Application September 12, 1936, Serial No 100,447

2 Claims. (Cl. 144—309)

This invention appertains to building, and more particularly to a novel structural unit, such as a beam or arch, and the novel method or process of fabricating such beam or arch.

One of the primary objects of our invention is to provide a laminated beam or arch possessing great structural strength, and which can be built in any desired length possessing any preferred curvature.

Another object of our invention is the provision of a beam or arch built up of a plurality of laminae rigidly secured together by a bonding agent, such as glue, under pressure, and formed during the drying of the bonding agent into the desired curve.

Another salient object of our invention is to provide a laminated beam or arch constructed from boards of the desired length, width, and thickness, disposed in superimposed relation, and bent and secured together by the use of suitable form jacks or clamps.

A further object of our invention is the provision of novel means for joining boards of the different laminae end to end, whereby beams or arches of great length can be produced.

A further important object of our invention is to provide novel means for arranging the joints of the boards of the different laminae relative to each other throughout the length of the beam or arch, so that the joint of one lamina will not be in direct alinement with the joint of the next lamina, and so that the beam and arch will possess great strength.

A still further object of our invention is to provide a laminated beam or arch in which boards of different length can be used in the different laminations in order that a beam and arch can be produced having a greater thickness at a desired point intermediate its ends than at its ends, with means for finishing the face of the beam or arch to produce a smooth and substantially unbroken surface.

A still further important object of our invention is the provision of a novel process for forming a beam of the above character, which consists in first rigidly uniting boards end to end to produce a desired length, applying glue to the opposite faces of the joined boards, arranging said boards face to face in the desired relation, and finally clamping together under pressure the pre-arranged boards with the desired curve.

A still further object of our invention is the provision of the novel step in the process which consists in tapering off the ends of the boards disposed on one side of the member, and uniting finishing strips to said side so treated by the use of glue and pressure.

With these and other objects in view, the invention consists in the novel construction, arrangement, and formation of parts, as will be hereinafter more specifically described, claimed, and illustrated in the accompanying drawings, in which one form of our improved process for constructing the beam or arch is illustrated.

In the drawings:

Figure 1 is an enlarged detailed, fragmentary edge elevation illustrating one means for joining boards end to end, which constitutes the initial step in our process and method of forming an arch or beam.

Figure 2 is a fragmentary edge elevation showing selected boards of the desired length piled one upon the other to form the beam, which constitutes the second step of our process.

Figure 3 is a fragmentary edge elevation showing an arch bent into the desired curve, which constitutes the third step of our process.

Figure 4 is a view similar to Figure 3 illustrating the means for applying pressure to the boards during the bending thereof.

Figure 5 is a fragmentary edge elevation of the arch showing the outer face of the arch trimmed to produce a plane surface, which constitutes the fourth step of our process.

Figure 6 is a fragmentary edge elevation of a complete beam with the finishing strips united in place on the treated outer surface of the arch.

Referring to the drawings in detail, wherein similar reference characters designate corresponding parts throughout the several views, the letter B generally indicates our improved laminated arch, which comprises a plurality of laminae 10, which preferably progressively decrease in length toward one face of the arch to form an arch having tapered ends. That is, the laminations are of different lengths. In producing an arch or beam of considerable length, it is impractical to utilize single length boards for all the laminations, and hence in accordance with our invention the relatively long laminations are built up of a plurality of boards 11 securely joined together at their meeting ends.

In fabricating one of the arches or members, the desired grade of lumber is selected, which can be built up into the different laminae for the member. The width is determined by the section required to give the necessary structural strength, and the length of the boards is determined by the overall length of the member. As stated above, if it is impossible or inexpedient to use a continuous board for each lamina, several boards are joined together, or else butted together, as the member is built up. Thus, the first step in our process consists of rigidly securing selected boards end to end, and we prefer to use a scarf joint 12 for this purpose. The length of the joint is many times the thickness of each board, and the faces of the joint are coated with the desired type of glue, after which the ends of the boards are brought together under great pressure until the joint is thoroughly dried. By forming the scarf joint 12 of great length a strong and rigid bond can be had.

Sufficient laminae of the preferred length are selected, and the opposite faces of the laminae are thoroughly coated with the desired grade of glue. As shown in Figure 2 of the drawings, the laminae gradually decrease in length so that an arch will be ultimately produced having tapered ends, with its greatest cross sectional area at its curved portion or any other point required to produce the necessary strength. The top or outermost boards 13 can be of a single length, as shown. These selected laminae are placed one above the other on an assembly table (not shown), after which they are turned on edge and firmly clamped along one end by clamping or jack devices 14 securely anchored to the floor. These jack members (where a curved arch is to be formed) are placed in the desired relation on a curve, and the assembled laminae are gradually bent and successively held by the clamps until the assembled boards assume the desired curvature. The screws 15 of the jack or clamp members are now tightened to their fullest extent, and the assembled laminae can be left in the form until the glue is dry, or, if preferred, the laminae, after being bent, can be clamped in place by removable U-shaped clamping members until dry.

While in the present illustration we have shown all of the different laminae glued up at the same time, it is to be understood that only a few laminae can be glued together in one operation, depending on the size of the member.

After all of the laminae have been firmly secured together, the ends of the boards or laminae are trimmed off, as indicated by the reference character 16, so that a substantially smooth surface will be had. In order to produce a finished appearance, however, finishing laminae 17, 18, and 19 can be utilized so as to produce a substantially unbroken, smooth effect. The finishing laminae are all of the same length, and extend from one end of the arch to the other, and are each formed from a plurality of boards 20 connected at their ends preferably by bonded scarf joints 21. When the finishing laminae are applied to the member, the member is again placed in the form jacks, and the finishing laminae are coated on their opposite faces with glue, are then placed in the form jacks and bent into the desired shape around the member, and are held in such shape, in close and continuous contact with one another, and with the face of the member, until the glue is dry.

The arch thus produced possesses great structural strength, and the laminae give a characteristic effect pleasing to the esthetic taste. Obviously, beams and arches of any desired length can be produced, and arches are capable of being used in vaulted structures, such as churches, gymnasiums, and the like.

The form jacks have not been shown or described in detail, in view of the fact that the same form the subject matter of a separate application for patent, Serial No. 100,448, filed September 12, 1936.

Particular attention is directed to the novel manner of arranging the joints of the different laminae relative to one another, and as shown in the various figures the joints of the laminae are staggered, so that the joints of one lamina will be out of alinement with the joints of the next adjacent lamina. These joints are also so disposed that the same will not occur at the curvature of the beam or arch. This is clearly illustrated in Figure 3 of the drawings, and is of great importance, as it reduces the hazard of the joints of the board tending to separate at the curve.

The member may be made up to the exact required size, or it may be made up of a larger size and later cut into the sections required.

In some instances, it might be possible to glue the ends of the laminae together at the same time that the laminae are assembled. In other instances, it might be possible to employ finished boards as obtained from the mill instead of planing the faces of the beams smooth after the assembling of the laminae.

Various changes in details may be made without departing from the spirit or scope of our invention, but what we claim as new is:

1. The process of producing a laminated member, which consists in joining the ends of boards together by glue and pressure to produce laminae of the desired lengths, coating the adjacent faces of the laminae with glue, applying pressure to the laminae to bring the glued faces into close and continuous contact, and bending the laminae into the desired curve with the joints of the boards of the laminae disposed in staggered relation and out of the curved portion of the member.

2. The process of forming a laminated member which consists in beveling adjacent ends of boards in opposite directions, applying glue to said beveled ends, arranging the beveled ends in overlapping relation and applying pressure until the glue is set to form laminae of the desired length, coating the adjacent faces of the laminae with glue throughout their length with the laminae progressively decreasing in length toward one face of the member, applying pressure to the laminae to bring the glued faces into close and continuous contact and retaining said pressure until the glued faces have set, trimming off the projecting ends of the laminae to produce a smooth face, joining the ends of other boards together to produce additional finishing laminae equal to the overall length of the member, coating the faces of the finishing laminae with glue and joining the finishing laminae together and to the smoothed face of the member by pressure until the last mentioned glued faces have set.

PETER THOMPSON.
HERBERT HANISCH.